United States Patent
Noumura

(10) Patent No.: US 8,821,345 B2
(45) Date of Patent: Sep. 2, 2014

(54) VEHICLE CONTROLLER

(75) Inventor: Shin Noumura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 224 days.

(21) Appl. No.: 13/256,545

(22) PCT Filed: Jun. 1, 2009

(86) PCT No.: PCT/JP2009/059983
§ 371 (c)(1), (2), (4) Date: Sep. 14, 2011

(87) PCT Pub. No.: WO2010/140204
PCT Pub. Date: Dec. 9, 2010

(65) Prior Publication Data
US 2012/0094802 A1    Apr. 19, 2012

(51) Int. Cl.
| | | |
|---|---|---|
| F16H 59/30 | (2006.01) | |
| F02D 29/02 | (2006.01) | |
| F02D 41/02 | (2006.01) | |
| B60W 10/11 | (2012.01) | |
| B60W 10/26 | (2006.01) | |
| B60W 10/06 | (2006.01) | |
| F02D 41/12 | (2006.01) | |
| B60W 10/30 | (2006.01) | |
| B60W 30/18 | (2012.01) | |
| B60W 10/08 | (2006.01) | |
| F02D 41/04 | (2006.01) | |

(52) U.S. Cl.
CPC ........ *F02D 29/02* (2013.01); *B60W 2710/1005* (2013.01); *F02D 41/023* (2013.01); *B60W 10/08* (2013.01); *B60W 10/11* (2013.01); *B60W 2710/0627* (2013.01); *B60W 10/26* (2013.01); *F02D 41/045* (2013.01); *B60W 10/06* (2013.01); *B60W 2710/305* (2013.01); *F02D 41/123* (2013.01); *B60W 10/30* (2013.01); *B60W 30/18136* (2013.01); *B60W 2030/18081* (2013.01); *B60W 2710/248* (2013.01)
USPC .......................................................... 477/121

(58) Field of Classification Search
USPC ...................................... 477/121, 115, 5, 123
See application file for complete search history.

(56) References Cited

U.S. PATENT DOCUMENTS

| 2006/0276937 A1 | 12/2006 | Yamashita | |
|---|---|---|---|
| 2012/0309585 A1 * | 12/2012 | Whitney et al. | 477/5 |

FOREIGN PATENT DOCUMENTS

| EP | 1 160 437 A2 | 12/2001 |
|---|---|---|
| JP | A-8-135778 | 5/1996 |
| JP | A-2001-342878 | 12/2001 |
| JP | A-2003-113726 | 4/2003 |
| JP | A-2006-340513 | 12/2006 |

* cited by examiner

*Primary Examiner* — Saul Rodriguez
*Assistant Examiner* — David J Hlavka
(74) *Attorney, Agent, or Firm* — Oliff PLC

(57) ABSTRACT

A vehicle controller includes an F/C control section, a battery voltage detection section, an AT control section, an alternator, and an ECU. The ECU determines the difference between a target deceleration for varying deceleration smoothly and a deceleration attained at each gear stage as a target deceleration which is generated by the alternator. The ECU compensates for the difference between target deceleration and the deceleration by the target deceleration to smooth variations in the deceleration of the whole vehicle, thereby improving drivability.

11 Claims, 11 Drawing Sheets

VEHICLE CONTROLLER

TECHNICAL FIELD

The present invention relates to a vehicle controller for a vehicle in which a fuel cut is performed to stop the fuel supply to an engine.

BACKGROUND ART

A technique has been heretofore known in which, if a driver releases an accelerator, a fuel cut is performed to stop fuel supply to an engine (internal combustion engine), thereby decelerating a vehicle. At the time of the start of the fuel cut and at the time of the return of the fuel cut, torque variations occur in the power transmission system of the vehicle, and satisfactory drivability is not obtained. Accordingly, in Patent Literature 1, the motor of a motor generator is activated before the fuel cut starts, and input shaft torque of an automatic transmission increases, thereby suppressing torque variations at the time of the start of the fuel cut. In Patent Literature 2, driving torque of a motor of an electric motor at the time of the return of the fuel cut increases, thereby suppressing torque variations at the time of the return of the fuel cut.

CITATION LIST

Patent Literature

[Patent Literature 1] Japanese Unexamined Patent Application Publication No. 2004-201408
[Patent Literature 2] Japanese Unexamined Patent Application Publication No. 2003-083106

SUMMARY OF INVENTION

Technical Problem

On the other hand, in an AT vehicle including a multi-speed automatic transmission, while the fuel cut is performed to reduce speed, shift control of the automatic transmission is performed. At this time, since a deceleration is discretely generated in accordance with a gear stage selected by the automatic transmission, at the time of shift control at a gear stage, a driving force level difference (also referred to torque variation, shift shock, or the like) is generated. However, in Patent Literatures 1 and 2, there is no consideration of the driving force level difference at the time of shift control during the fuel cut, such that drivability during the fuel cut is insufficient.

This is because throttle control is performed to generate a continuous deceleration at the time of shift control during the fuel cut. However, in this case, mileage grows worse.

Accordingly, an object of the invention is to provide a vehicle controller capable of improving drivability during the fuel cut without worsening mileage.

Solution to Problem

An aspect of the invention provides a vehicle controller for a vehicle in which a fuel cut is performed to stop fuel supply to an engine. A change in deceleration during the fuel cut is smoothed by load control of an engine accessory which is provided in the vehicle and driven by power of an engine, and a gear stage is selected such that the power balance of an electric storage device which is charged by an alternator becomes close to zero.

In the vehicle controller according to the aspect of the invention, load control of an engine accessory is performed to adjust the deceleration of the vehicle, thereby reducing a change in deceleration during the fuel cut. Therefore, it is possible to relieve a shift shock at the time of shift control during the fuel cut, without performing throttle control. For this reason, it is possible to improve drivability during the fuel cut without worsening mileage.

It is preferable that a difference between the deceleration of the vehicle in which the fuel cut is performed and a target deceleration is compensated for by load control of the engine accessory. With the above, the difference between the deceleration of the vehicle in which the fuel cut is performed and the target deceleration is compensated for by load control of the engine accessory, making it possible to appropriately relieve a shift shock at the time of shift control during the fuel cut.

In this case, it is preferable that load control of the engine accessory changes on the basis of the presence/absence of the fuel cut being performed. When the fuel cut is not performed, it is possible to adjust the deceleration of the vehicle by controlling at least one of a fuel injection amount, an ignition time lag, and a throttle opening. When the fuel cut is performed, since fuel is not supplied to the engine, it is not possible to adjust the deceleration of the vehicle by controlling a fuel injection amount, an ignition time lag, and a throttle opening, but it is possible to adjust the deceleration of the vehicle by load control of the engine accessory. Therefore, load control of the engine accessory changes on the basis of the presence/absence of the fuel cut being performed, thereby appropriately adjusting the deceleration of the vehicle.

It is preferable that the engine accessory is an alternator, and when the fuel cut is performed, the deceleration of the vehicle is adjusted by load control of an alternator. With the above, when the fuel cut is performed, it is not possible to adjust the deceleration of the vehicle by controlling a fuel injection amount, an ignition time lag, and a throttle opening. Therefore, when the fuel cut is performed, the deceleration of the vehicle is adjusted by load control of the alternator, thereby appropriately adjusting the deceleration of the vehicle.

It is preferable that, when the fuel cut is not performed, the deceleration of the vehicle is adjusted on the basis of at least one of a fuel injection amount, an ignition time lag, and a throttle opening. With the above, when the fuel cut is not performed, the deceleration of the vehicle is adjusted by controlling at least one of the fuel injection amount, the ignition time lag, and the throttle opening, making it possible to more carefully adjust the deceleration of the vehicle.

It is preferable that, when the fuel cut is performed, charge/discharge control is performed in accordance with the deceleration and the shift timing of a gear stage to be selected. During the fuel cut, the deceleration differs depending on the gear stage to be selected. Therefore, charge/discharge control is performed in accordance with the deceleration and the shift timing of the gear stage to be selected, thereby appropriately relieving a shift shock at the time of shift control during the fuel cut.

It is preferable that a gear stage is selected in accordance with the amount of charge or voltage of the electric storage device.

It is preferable that, at the time of the start of the fuel cut, load control of the engine accessory gradually increases.

It is preferable that, immediately after the return from the fuel cut, a deceleration having a phase opposite to a fuel cut return level difference-equivalent acceleration generated due to the return from the fuel cut by load control of the engine accessory.

It is preferable that a gear stage is selected in accordance with an electrical energy generation integrated value of the alternator.

It is preferable that, when returning from the fuel cut, a deceleration which is attained by load control of the engine accessory is asymptotically approximated to a fuel cut return level difference-equivalent acceleration generated due to the return from the fuel cut.

Advantageous Effects of Invention

According to the invention, it is possible to improve drivability during a fuel cut without worsening mileage.

DESCRIPTION OF EMBODIMENTS

Figure 1:
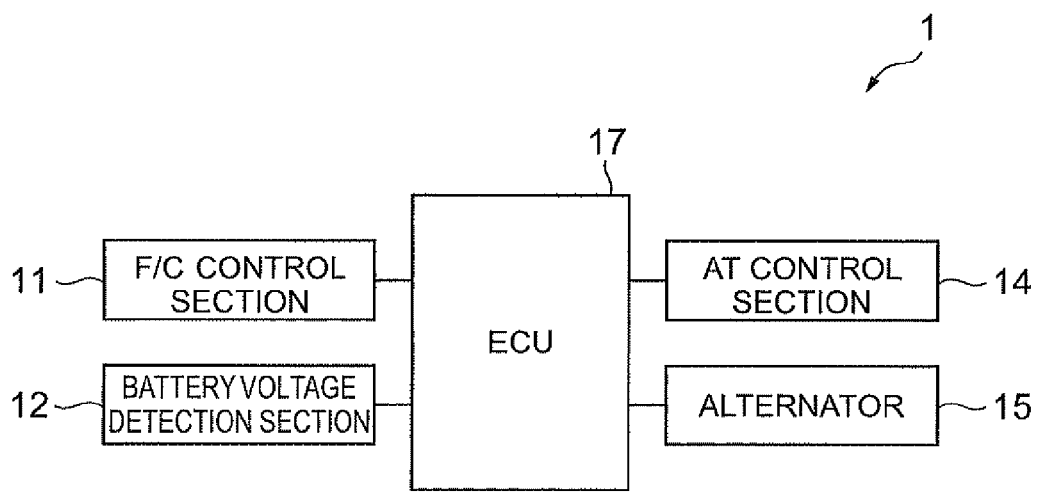
FIG. 1 is a diagram showing the block configuration of a vehicle controller according to a first embodiment.

Hereinafter, preferred embodiments of a vehicle controller according to the invention will be described in detail with reference to the drawings. A vehicle controller according to the invention is mounted in a vehicle in which a fuel cut is performed to stop fuel supply to an engine when a driver releases an accelerator to reduce speed. In the drawings, the same or equivalent portions are represented by the same reference numerals.

First Embodiment

FIG. 1 is a diagram showing the block configuration of a vehicle controller according to a first embodiment. As shown in FIG. 1, a vehicle controller 1 of this embodiment adjusts the deceleration of a vehicle in which a fuel cut is performed. Thus, the vehicle controller 1 includes an F/C control section 11, a battery voltage detection section 12, an AT control section 14, an alternator 15, and an ECU 17.

The F/C control section 11 performs a fuel cut to stop fuel supply to an engine (not shown) when the driver releases the accelerator to decelerate the vehicle. That is, if a predetermined fuel cut condition is established, the F/C control section 11 controls an electronically controlled fuel injection device (not shown), which injects fuel into the engine, to stop fuel injection into the engine. The F/C control section 11 transmits information regarding whether or not a fuel cut is performed to the ECU 17.

The battery voltage detection section 12 is a sensor which detects the SOC (State of Charge) of a battery (not shown) to be charged by the alternator 15 and a battery voltage. The battery voltage detection section 12 transmits the SOC and the battery voltage to the ECU 17.

The AT control section 14 is a control device which performs shift control of a multi-speed automatic transmission (not shown). The AT control section 14 selects an optimum gear stage on the basis of a command of the ECU 17, and performs shift control to shift the automatic transmission to the selected gear stage.

The alternator 15 is an alternating-current generator which is driven to rotate with power of the engine to generate electrical energy and charges the battery with generated electrical energy. The alternator 15 is connected to the output shaft of the engine through a belt or the like, and an excitation current is supplied to an excitation coil (not shown), such that the alternator 15 rotates to generate energy. In the alternator 15, the electrical energy generation of the alternator 15 changes under the control of the excitation current in the ECU 17, such that charge/discharge control of the battery is performed. In the alternator 15, the driving torque of the alternator 15 varies under the control (load control) of the excitation current in the ECU 17, such that the deceleration of the vehicle changes. The alternator 15 also functions as an engine accessory of the vehicle.

The ECU 17 selects a gear stage and performs load control of the engine accessory on the basis of information transmitted from the F/C control section 11 and the battery voltage detection section 12, and adjusts the deceleration of the vehicle. Although the engine accessory which is subjected to load control by the ECU 17 includes the alternator 15, an air compressor (not shown), or the like, in this embodiment, description will be provided as to the alternator 15 as an example of the engine accessory. The ECU 17 smoothes (reduces) a change in deceleration by the selection of the gear stage under the control of the AT control section 17 and the control of the excitation current in the alternator 15 to adjust the target deceleration which is required by the driver.

Figure 2:
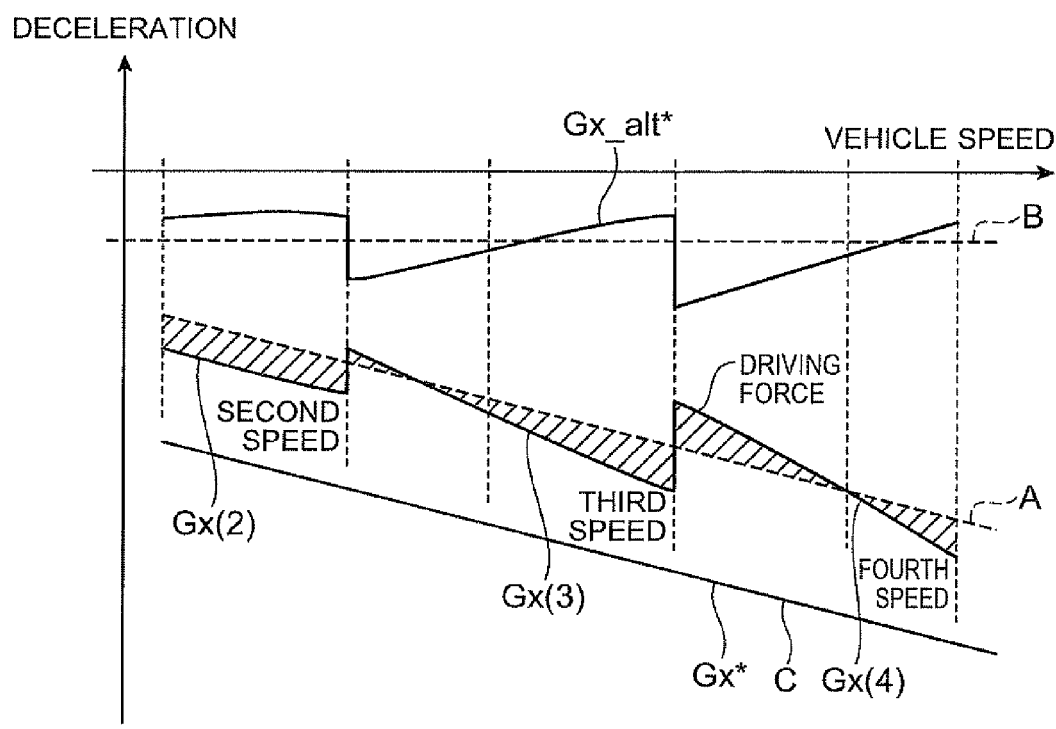
FIG. 2 is a diagram showing the deceleration of a vehicle during a fuel cut.

Here, a deceleration will be described with reference to FIG. 2. FIG. 2 is a diagram showing a deceleration during a fuel cut. In FIG. 2, the horizontal axis represents a vehicle speed, and the vertical axis represents a deceleration. A indicates a deceleration which is attained by the engine. B indicates a deceleration which is attained by the alternator 15. C indicates a deceleration which is attained by the whole vehicle.

As shown in FIG. 2, the deceleration C which is attained by the whole vehicle becomes the total value of the deceleration A which is attained by the engine and the deceleration B which is attained by the alternator 15.

On the other hand, the deceleration A is a deceleration when shift control of a gear stage is not performed during the fuel cut. For this reason, the deceleration A is expressed by a line or a curve which changes smoothly, and the deceleration C which is attained by the whole vehicle is also expressed by a line or a curve which changes smoothly.

However, actually, shift control of a gear stage is performed during the fuel cut. Since a deceleration Gx(i) which is attained at each gear stage i changes discretely, a driving force level difference is generated at the time of shift control of the gear stage i.

Accordingly, the ECU 17 controls the excitation current of the alternator 15 in accordance with the deceleration Gx(i) of the gear stage i to be selected and the shift timing at which shift control is performed, and smooths a change in the deceleration of the whole vehicle. Specifically, the ECU 17 sets a difference between a target deceleration Gx* with a deceleration changing smoothly and a deceleration Gx(i) which is attained at each gear stage as a target deceleration Gx_alt* which is generated by the alternator 15. The ECU 17 compensates for the difference between the target deceleration Gx* and the deceleration Gx(i) by the target deceleration Gx_alt*, thereby smoothing a change in the deceleration of the whole vehicle and improving drivability.

Figure 3:
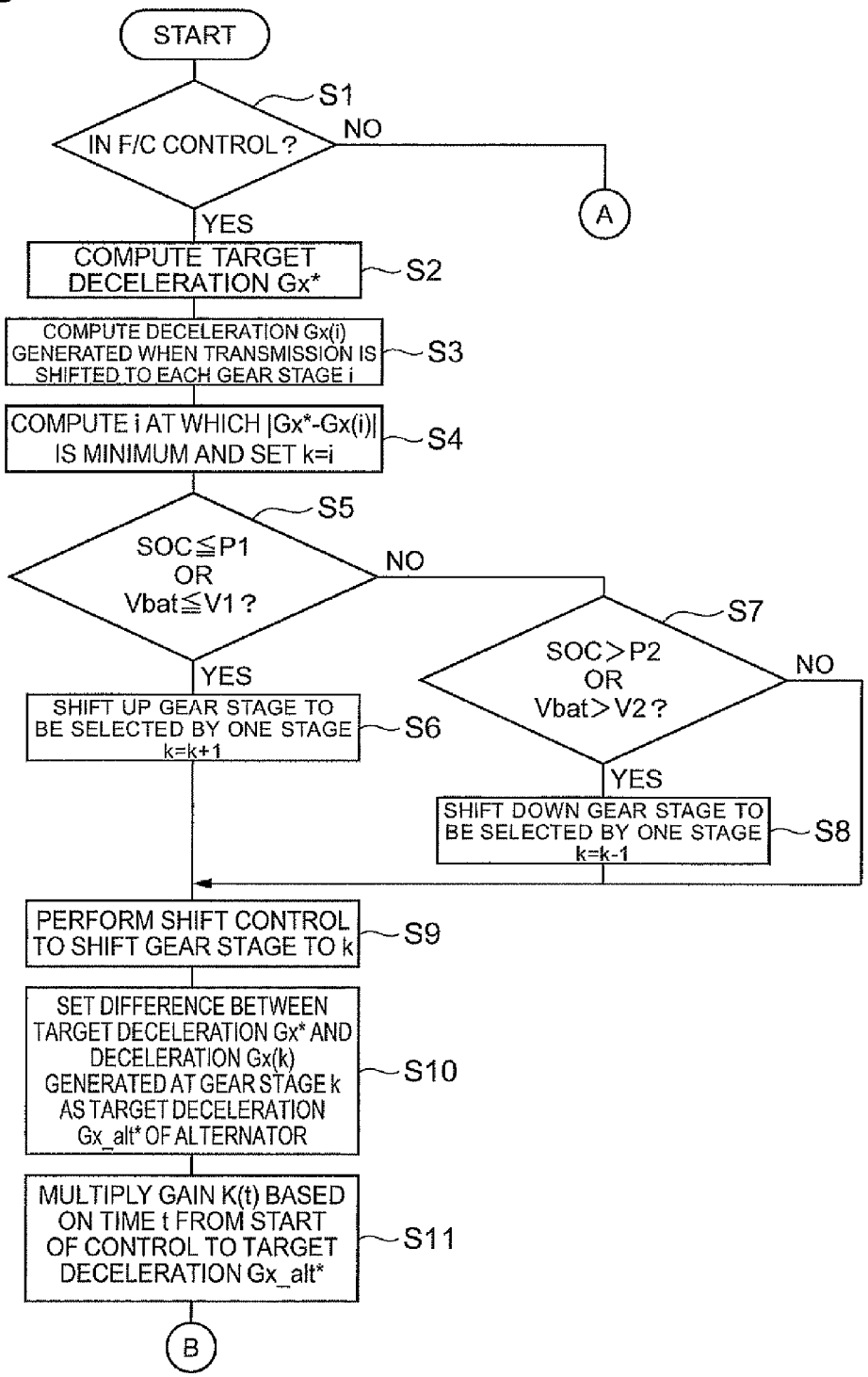
FIG. 3 is a flowchart showing the processing operation of a vehicle controller 1 according to the first embodiment.
Figure 4:
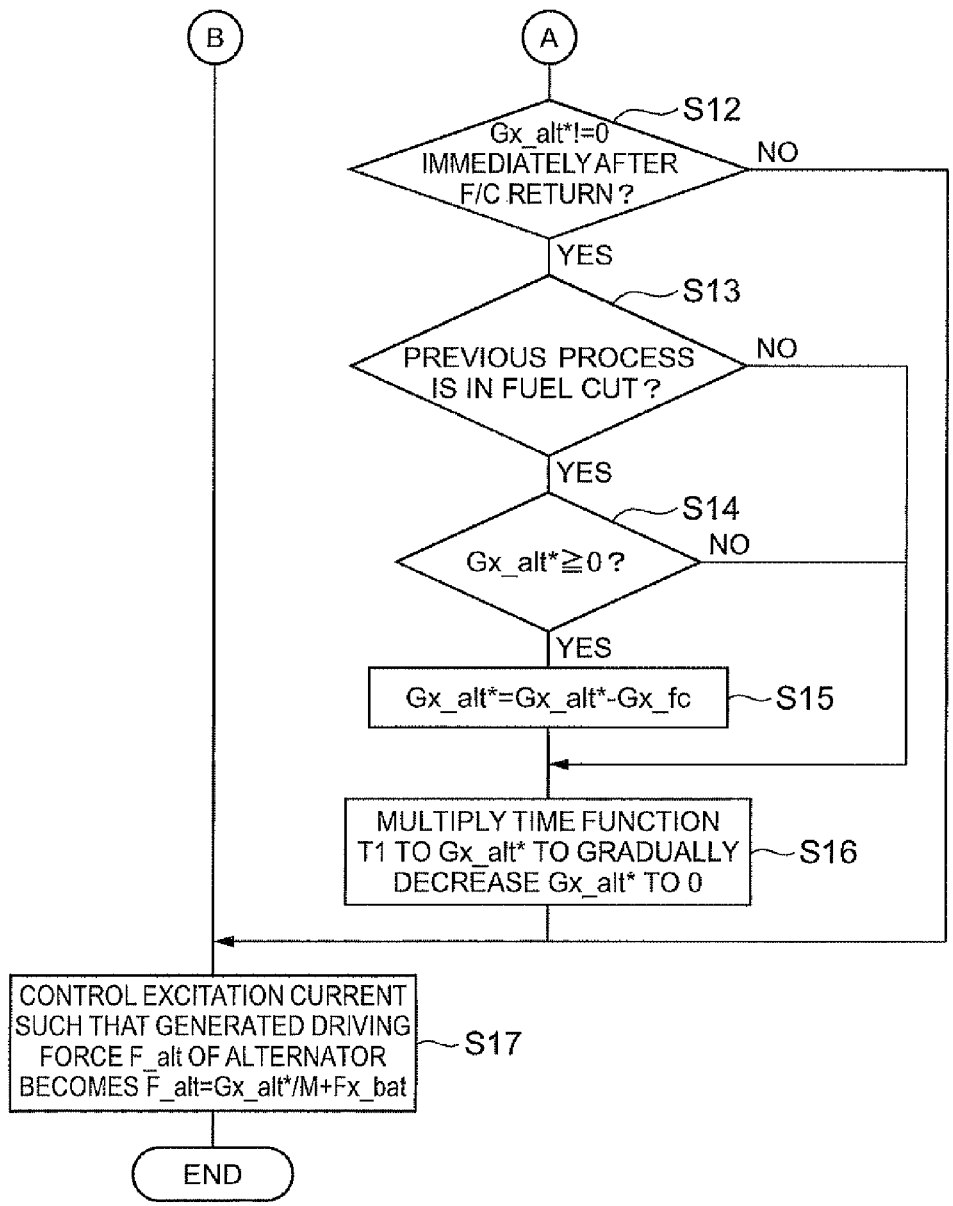
FIG. 4 is a flowchart showing the processing operation of the vehicle controller 1 according to the first embodiment.

Next, the processing operation of the vehicle controller 1 according to the first embodiment will be described with reference to FIGS. 3 and 4. FIGS. 3 and 4 are flowcharts showing the processing operation of the vehicle controller 1 according to the first embodiment. The following process is performed by the ECU 17 of the vehicle controller 1, and is repeatedly performed in a predetermined cycle.

First, the ECU 17 analyzes information transmitted from the F/C control section 11 and determines whether or not a fuel cut is performed (Step S1).

If it is determined that the fuel cut is performed (Step S1: YES), the ECU 17 computes the target deceleration Gx* (Step S2). As described above, the target deceleration Gx* is expressed by a line or a curve which changes smoothly. The target deceleration Gx* is calculated on the basis of, for example, a driving operation, such as an accelerator operation or a brake operation of a driver. When the target deceleration Gx* corresponding to the conditions is in the form of a map, the target deceleration Gx* may be read from the map.

Next, the ECU 17 computes the deceleration Gx(i) which is generated when the automatic transmission is shifted to each gear stage i (Step S3). In this case, when the number of gear stages of the automatic transmission is n, i=1 to n. The deceleration Gx(i) is calculated on the basis of the conditions, for example, the gear ratio of each gear stage i, the vehicle speed, the engine speed, and the like. When the deceleration corresponding to the conditions is in the form of a map, the deceleration Gx(i) may be read from the map.

Next, the ECU 17 computes a gear stage i at which the absolute value (|Gx*−Gx(i)|) of the difference between the target deceleration Gx* computed in Step S2 and the deceleration Gx(i) computed in Step S3 is minimum. The ECU 17 sets the computed gear stage i as a gear stage k to be selected (Step S4). That is, the ECU 17 selects a gear stage which attains the deceleration Gx(i) closest to the target deceleration Gx*. In this way, while an arbitrary deceleration is attained, even when deceleration control by the alternator 15 stops, it is possible to attain the same deceleration as when a deceleration is attained by a single piece of engine.

The ECU 17 determines whether or not at least one of SOC≤P1 and Vbat≤V1 is established (Step S5). That is, the ECU 17 determines whether or not the SOC transmitted from the battery voltage detection section 12 is equal to or smaller than a predetermined threshold value P1 or a battery voltage Vbat transmitted from the battery voltage detection section 12 is equal to or smaller than a predetermined threshold value V1. P1 is the threshold value of the SOC, and is, for example, 30%. V1 is the threshold value of the battery voltage Vbat, and is, for example, 11 [V].

If it is determined that at least one of SOC≤P1 and Vbat≤V1 is established (Step S5: YES), the ECU 17 shifts up the gear stage k selected in Step S4 by one stage (Step S6).

If it is determined that both SOC≤P1 and Vbat≤V1 are not satisfied (Step S5: NO), the ECU 17 determines whether or not at least one of SOC>P2 and Vbat>V2 is satisfied (Step S7). That is, the ECU 17 determines whether or not the SOC transmitted from the battery voltage detection section 12 is greater than a predetermined threshold value P2 or the battery voltage Vbat transmitted from the battery voltage detection section 12 is greater than a predetermined threshold value V2. P2 is the threshold value of the SOC greater than P1, and is, for example, 70%. V2 is the threshold value of the battery voltage Vbat greater than V1, and is, for example, 14 [V].

If it is determined that at least one of SOC>P2 and Vbat>V2 is satisfied (Step S7: YES), the ECU 17 shifts down the gear stage k selected in Step S4 by one stage (Step S8).

If it is determined that both SOC>P2 and Vbat>V2 are not satisfied (Step S7: NO), the ECU 17 does not change the gear stage k selected in Step S4, and progresses to Step S9 described below.

As described above, a gear stage to be selected is adjusted in accordance with the values of the SOC and the battery voltage, making it possible to efficiently recover electrical energy from the alternator 15 while satisfying the target deceleration Gx*.

Next, the ECU 17 controls the AT control section 14 to perform shift control to shift the automatic transmission to the gear stage k (Step S9).

Next, the ECU 17 sets the difference between the target deceleration Gx* computed in Step S2 and a deceleration Gx(k) generated at the gear stage k subjected to shift control in Step S9 as the target deceleration Gx_alt* of the alternator 15 (Step S10). That is, the ECU 17 computes Gx_alt*=Gx*−Gx_alt* to obtain the target deceleration Gx_alt* of the alternator 15.

Figure 5:
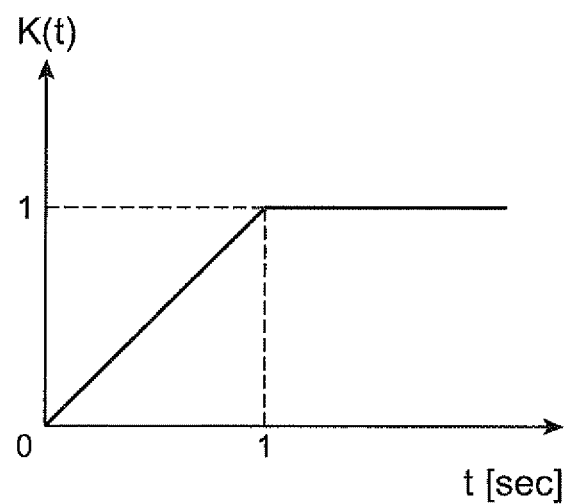
FIG. 5 is a diagram showing an example of a gain.

Next, the ECU 17 multiplies a gain K(t) based on the time t from when fuel cut control starts to the target deceleration Gx_alt* of the alternator 15 computed in Step S10 (Step S11). The gain K(t) is a time function which gradually increases from zero, and is, for example, a function which increases from zero to 1 until one second elapses since fuel cut control starts, as shown in FIG. 5.

On the other hand, if the driver releases the accelerator and the fuel cut condition is satisfied, the fuel cut starts. While the fuel cut is performed, if the compensation by the alternator 15 starts, the deceleration rapidly varies. Accordingly, if the driver releases the accelerator, the ECU 17 controls a lag, a fuel injection amount, a throttle opening, or the like to gradually decrease driving torque. In this process, the ECU 17 gradually increases the compensation by the alternator 15 on the basis of the target deceleration Gx_alt* multiplied by the gain K(t). In this way, it is possible to reduce a shock or a sense of discomfort when the compensation by the alternator 15 starts. The ECU 17 progresses to Step S17 described below.

If it is determined in Step S1 that it is not in the fuel cut (Step S1: NO), the ECU 17 determines whether or not it is immediately after the return from the fuel cut (Step S12). At this time, the ECU 17 determines whether or not it is immediately after the return from the fuel cut on the basis of whether or not the target deceleration Gx_alt* of the alternator 15 is other than 0. That is, if the target deceleration Gx_alt* is other than 0, it is determined that it is immediately after the return from the fuel cut. If the target deceleration Gx_alt* is 0, it is determined that it is not immediately after the return from the fuel cut.

If it is determined that it is not immediately after the return from the fuel cut (Step S12: NO), the ECU 17 progresses to Step S17 described below.

If it is determined that it is immediately after the return from the fuel cut (Step S12: YES), the ECU 17 determines whether or not a previous process is performed in the fuel cut (Step S13).

If it is determined that the previous process is not performed in the fuel cut (Step S13: NO), the ECU 17 progresses to Step S17 described below.

If it is determined that the previous process is performed in the fuel cut (Step S13: YES), the ECU 17 determines whether or not the target deceleration $Gx\_alt^*$ is equal to or greater than 0 ($Gx\_alt^* \geq 0$) (Step S14). The target deceleration $Gx\_alt^*$ is used to compensate for the difference between the target deceleration $Gx^*$ and the deceleration $Gx(i)$. For this reason, the ECU 17 determines whether or not the target deceleration $Gx\_alt^*$ is equal to or greater than 0, thereby determining whether or not the deceleration $Gx(k)$ is greater than the target deceleration $Gx^*$ at the time of the return of the fuel cut.

If it is determined that the target deceleration $Gx\_alt^*$ is smaller than 0 (Step S14: NO), the ECU 17 progresses to Step S16 described below. When the target deceleration $Gx\_alt^*$ is smaller than 0, this means that, at the time of the return of the fuel cut, the deceleration $Gx(k)$ is greater than the target deceleration $Gx^*$.

If it is determined that the target deceleration $Gx\_alt^*$ is equal to or greater than 0 (Step S14: YES), the ECU 17 subtracts a fuel cut return level difference-equivalent acceleration $Gx\_fc$, which is generated due to the return from the fuel cut, from the target deceleration $Gx\_alt^*$ (Step S15). When the target deceleration $Gx\_alt^*$ is equal to or greater than 0, this means that, at the time of the return of the fuel cut, the deceleration $Gx(k)$ is smaller than the target deceleration $Gx^*$.

Figure 6:
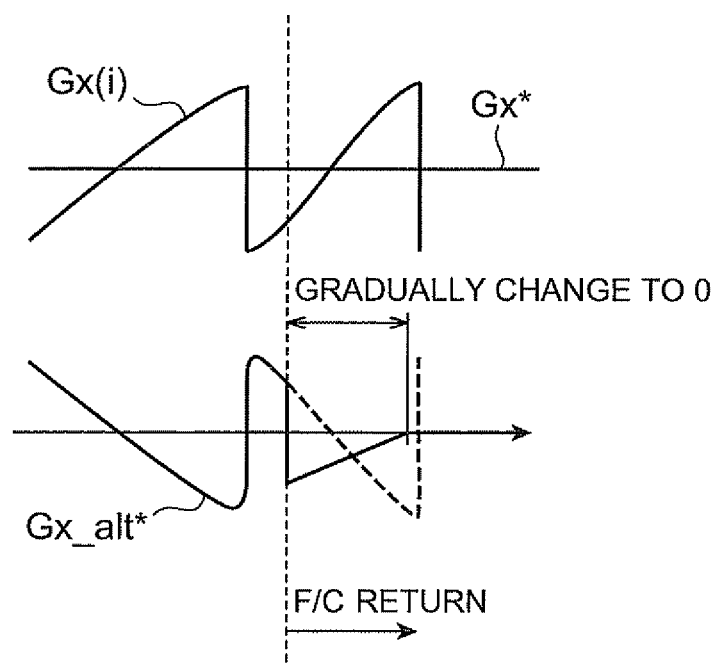
FIG. 6 is a diagram showing a control image of an ECU.
Figure 7:
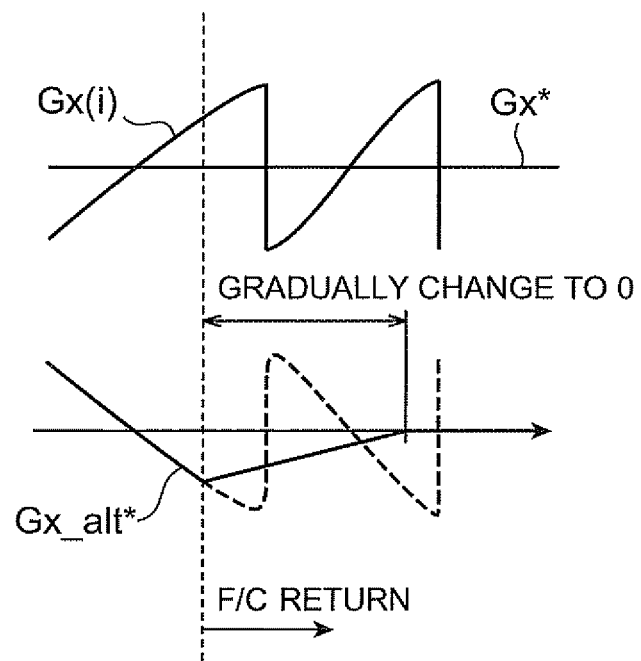
FIG. 7 is a diagram showing a control image of an ECU.

FIGS. 6 and 7 are diagrams showing a control image of an ECU. As shown in FIG. 6, the ECU 17 controls the excitation current of the alternator 15 at the time of the return from the fuel cut, and generates a deceleration having a phase opposite to the fuel cut return level difference-equivalent accelerator $Gx\_fc$ which is generated due to the return from the fuel cut. When this happens, the fuel cut return level difference-equivalent acceleration $Gx\_fc$ which is generated at the time of the return from the fuel cut is cancelled, thereby reducing a driving force level difference which is generated at the time of the return from the fuel cut.

Next, the ECU 17 multiplies a time function T1 based on the time t after the return from the fuel cut to the target deceleration $Gx\_alt^*$ (Step S16). The time function T1 is a time function which gradually decreases from 1 and becomes zero. As shown in FIGS. 6 and 7, the time function T1 is multiplied to the target deceleration $Gx\_alt^*$, such that the target deceleration $Gx\_alt^*$ gradually approaches zero with time after the return from the fuel cut.

If the above-described process ends, the ECU 17 controls the excitation current of the alternator 15 such that a generated driving force $F\_alt$ of the alternator 15 becomes $F\_alt = Gx\_alt^* \times M + Fx\_bat$ (Step S17). Here, M represents a vehicle weight, and $Fx\_bat$ represents a battery voltage FB control command for setting the SOC as a target voltage through SOC feedback control.

Second Embodiment

Figure 8:
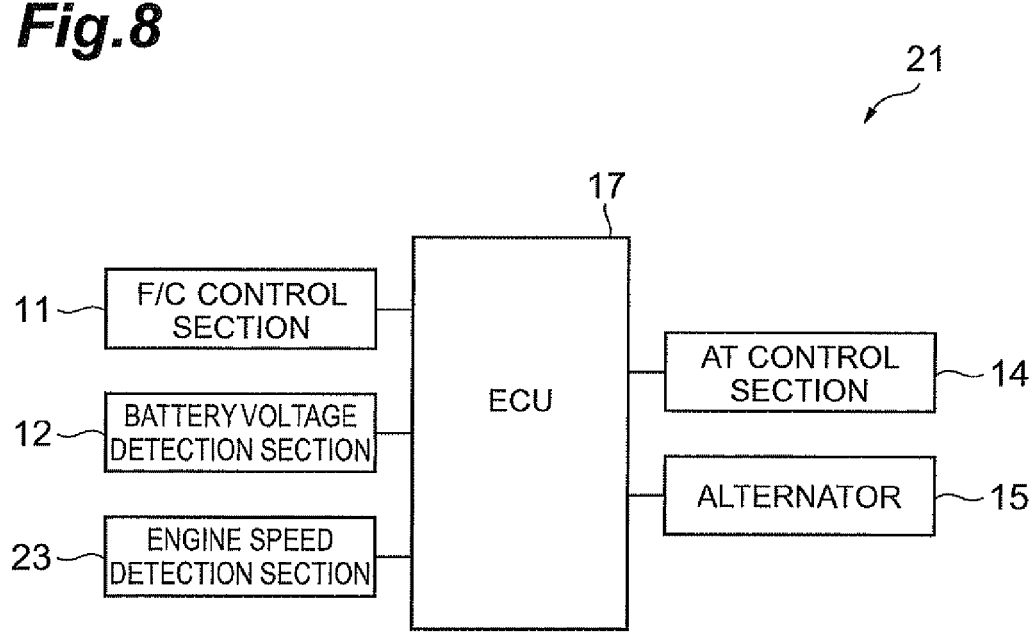
FIG. 8 is a diagram showing the block configuration of a vehicle controller according to a second embodiment.

FIG. 8 is a diagram showing the block configuration of a vehicle controller according to a second embodiment. As shown in FIG. 8, a vehicle controller 21 according to a second embodiment adjusts the deceleration of a vehicle in which a fuel cut is performed. To this end, as in the first embodiment, the vehicle controller 21 includes an F/C control section 11, a battery voltage detection section 12, an engine speed detection section 23, an AT control section 14, an alternator 15, and an ECU 17. The vehicle controller 21 further includes the engine speed detection section 23 which detects the engine speed.

Figure 9:
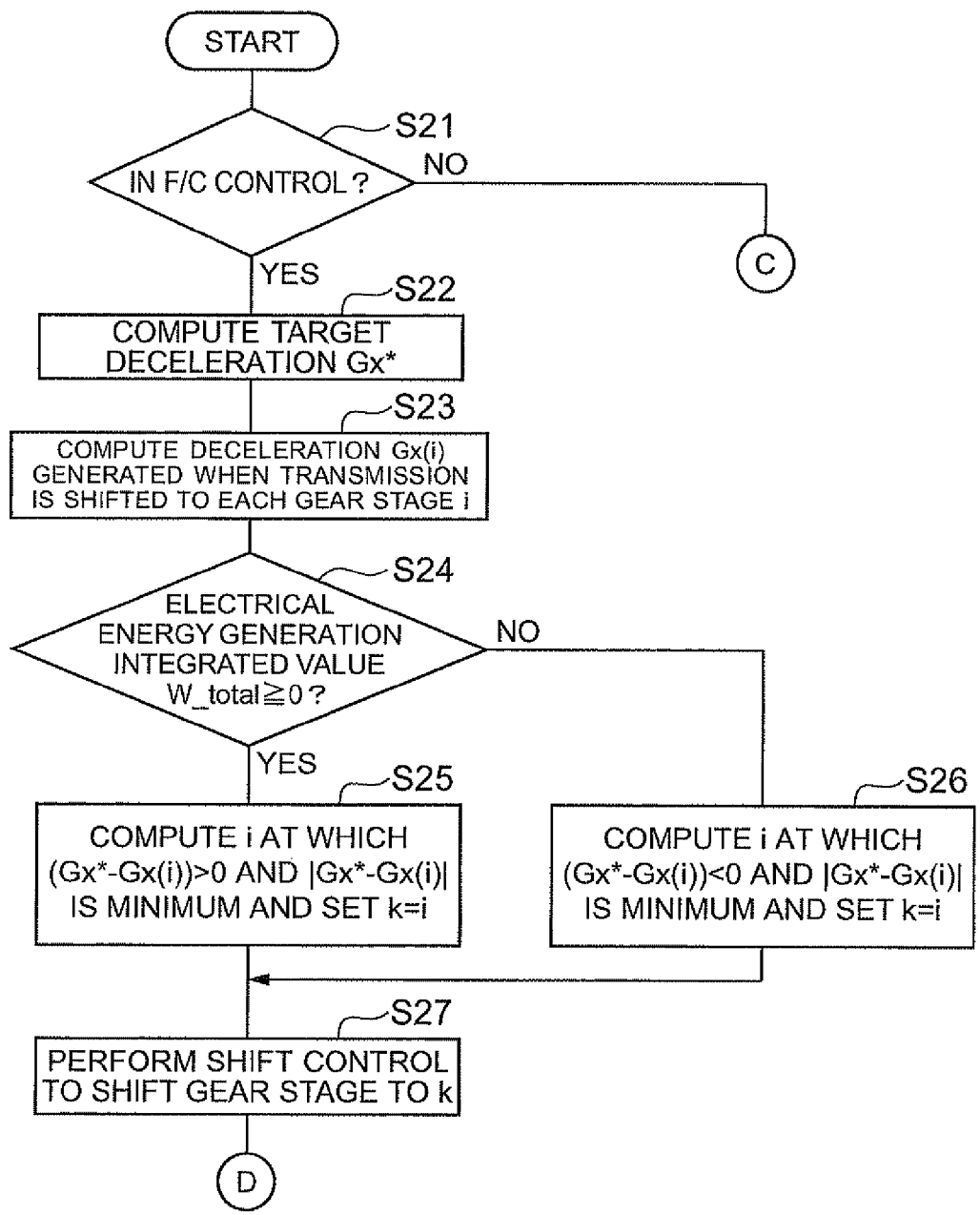
FIG. 9 is a diagram showing the block configuration of the vehicle controller according to the second embodiment.
Figure 10:
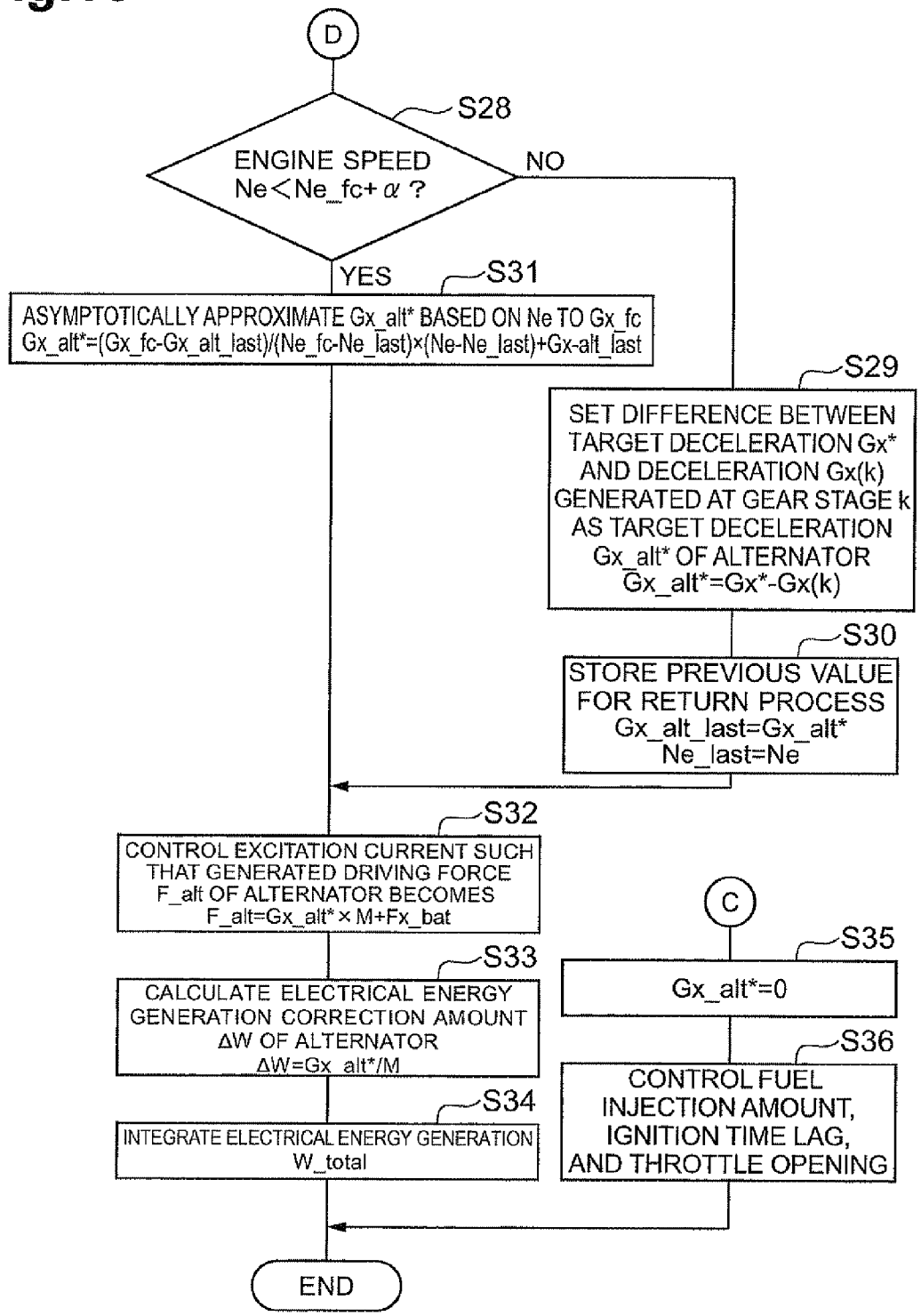
FIG. 10 is a diagram showing the block configuration of the vehicle controller according to the second embodiment.

Next, the processing operation of the vehicle controller 21 according to the second embodiment will be described with reference to FIGS. 9 and 10. FIGS. 9 and 10 are flowcharts showing the processing operation of the vehicle controller 21 according to the second embodiment. The following process is performed by the ECU 17 of the vehicle controller 21, and is repeatedly performed in a predetermined cycle.

First, the ECU 17 analyzes information transmitted from the F/C control section 11 to determine whether or not it is in the fuel cut (Step S21).

If it is determined that it is in the fuel cut (Step S21: YES), the ECU 17 computes a target deceleration $Gx^*$ (Step S22). As described above, the target deceleration $Gx^*$ is expressed by a line or a curve which changes smoothly. The target deceleration $Gx^*$ is calculated on the basis of, for example, a driving operation, such as an accelerator operation or a brake operation of a driver.

Next, the ECU 17 computes a deceleration $Gx(i)$ which is generated when the automatic transmission is shifted to each gear stage i (Step S23). In this case, when the number of gear stages of the automatic transmission is n, i=1 to n. The deceleration $Gx(i)$ is calculated on the basis of the conditions, for example, the gear ratio of each gear stage i, the vehicle speed, the engine speed, and the like.

Next, the ECU 17 determines whether or not an electrical energy generation integrated value W_total by the alternator 15 is equal to or greater than 0 (Step S24). The electrical energy generation integrated value W_total is a value computed in Step S34 described below in a previous process.

If it is determined that the electrical energy generation integrated value W_total is equal to or greater than 0 (Step S24: YES), the ECU 17 computes a gear stage i at which the value obtained by subtracting the deceleration $Gx(i)$ from the target deceleration $Gx^*$ is greater than 0, and the absolute value of the value obtained by subtracting the deceleration $Gx(i)$ from the target deceleration $Gx^*$ is minimum. That is, the ECU 17 computes the gear stage i at which $(Gx^* - Gx(i)) > 0$ is satisfied and $|Gx^* - Gx(i)|$ is minimum. The ECU 17 sets the computed gear stage i as the gear stage k to be selected (Step S25). That is, when the electrical energy integrated value W_total is equal to or greater than 0, the ECU 17 selects a gear stage at which the electrical energy generation by the alternator 15 is negative (−) and a deceleration closest to the target deceleration $Gx^*$ is attained. Therefore, it is possible to make the total amount of charge/discharge from the battery be 0 or near 0, and to minimize the influence on the charge/discharge balance (power balance).

It is determined that the electrical energy generation integrated value W_total is smaller than 0 (Step S24: NO), the ECU 17 computes a gear stage i at which the value obtained by subtracting the deceleration $Gx(i)$ from the target deceleration $Gx^*$ is smaller than 0, and the absolute value of the value obtained by subtracting the deceleration $Gx(i)$ from the target deceleration $Gx^*$ is minimum. That is, the ECU 17 computes the gear stage i at which $(Gx^* - Gx(i)) < 0$ is satisfied and $|Gx^* - Gx(i)|$ is minimum. The ECU 17 sets the computed gear stage i as the gear stage k to be selected (Step S26). That is, when the electrical energy generation integrated value W_total is smaller than 0, the ECU 17 selects a gear stage at which the electrical energy generation by the alternator 15 is positive (+), and a deceleration closest to the target deceleration $Gx^*$ is attained. Therefore, it is possible to make the total amount of charge/discharge from the battery be 0 or near 0, and to minimize the influence on the charge/discharge balance (power balance).

Next, the ECU 17 controls the AT control section 14 to perform shift control to shift the automatic transmission to the gear stage k (Step S27).

Next, the ECU 17 determines whether or not an engine speed Ne transmitted from the engine speed detection section 23 satisfies Ne<Ne_fc+α (Step S28). Ne_fc represents an engine speed at the time of the return of the fuel cut. α represents an asymptotic control amount approximation execution revolution speed having a predetermined value, and is, for example, 100 [rpm].

If it is determined that Ne<Ne_fc+α, is not satisfied (Step S28: NO), the ECU 17 sets the difference between the target deceleration Gx* and the deceleration Gx(k) generated at the gear stage k as the target deceleration Gx_alt* of the alternator 15 (Step S29). Specifically, Gx_alt*=Gx*−Gx(k) is computed to obtain the target deceleration Gx_alt*.

For a next process, the ECU 17 stores the target deceleration Gx_alt* obtained in Step S29 as a previous value Gx_alt_last for a return process, and stores the engine speed Ne at this time as a return process previous value Ne_last for a return process (Step S30).

If it is determined that Ne<Ne_fc+α is satisfied (Step S28: YES), the ECU 17 asymptotically approximates the target deceleration Gx_alt* to the fuel cut return level difference-equivalent acceleration Gx_fc in accordance with the engine speed Ne (Step S31).

Figure 11:
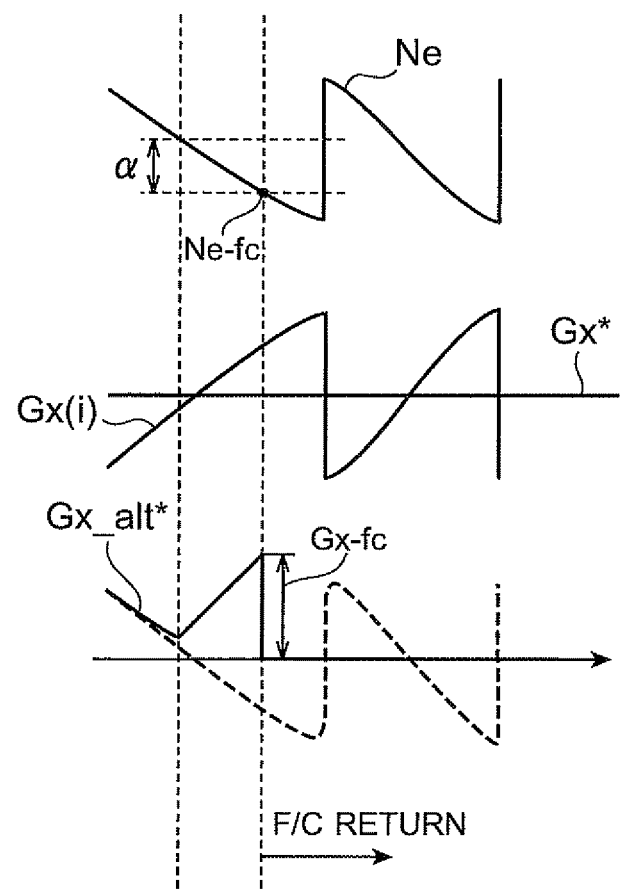
FIG. 11 is a diagram showing a control image of an ECU.

FIG. 11 is a diagram showing a control image of an ECU. As shown in FIG. 11, the ECU 17 asymptotically approximates the target deceleration Gx_alt* to the fuel cut return level difference-equivalent acceleration Gx_fc until the current engine speed Ne which is the fuel cut return engine speed Ne_fc+the asymptotic control amount approximation execution revolution speed α becomes the fuel cut return engine speed Ne_fc. Specifically, Gx_alt*=(Gx_fc−Gx_alt_last)/(Ne_fc−Ne_last)×(Ne−Ne_last)+Gx_alt_last is computed to obtain the target deceleration Gx_alt*. Gx_alt_last and Ne_last are previous values for a return process stored in Step S30 in the previous process. Gx_alt_last represents the previous value for a return process of the target deceleration Gx_alt*, and Ne_last represents the previous value for a return process of the engine speed Ne.

As described above, at the time of the return from the fuel cut, the target deceleration Gx_alt* is asymptotically approximated to the fuel cut return level difference-equivalent acceleration Gx_fc, making it possible to cancel the driving force level difference at the time of the return of the fuel cut, and to make the compensation amount by the alternator 15 be 0.

If the above-described process ends, the ECU 17 controls the excitation current of the alternator 15 such that the generated driving force F_alt of the alternator 15 becomes F_alt=Gx_alt*×M+Fx_bat (Step S32). Here, M represents a vehicle weight, and Fx_bat represents a battery voltage FB control command for setting the SOC as a target voltage through SOC feedback control.

Next, the ECU 17 computes ΔW=Gx_alt*/M to calculate an electrical energy generation correction amount ΔW generated through the compensation by the alternator 15 (Step S33).

Next, for a next process cycle, the ECU 17 integrates the electrical energy generation to calculate the electrical energy generation integrated value W_total (Step S34).

If it is determined in Step S21 that it is not in the fuel cut (Step S21: NO), the ECU 17 sets the target deceleration Gx_alt* of the alternator 15 to 0 (Step S35).

The ECU 17 controls at least one of the fuel injection amount, the ignition time lag, and the throttle opening to adjust the deceleration of the vehicle (Step S36).

As described above, in the vehicle controller 1 or 21 of the embodiment, the excitation current of the alternator 15 is controlled to adjust the deceleration of the vehicle, thereby smoothing a change in the deceleration during the fuel cut. Therefore, it is possible to relieve a shift shock at the time of shift control during the fuel cut without performing throttle control. For this reason, it is possible to improve drivability during the fuel cut without worsening mileage.

The difference between the target deceleration Gx* and the deceleration Gx(k) generated at the gear stage k is set as the target deceleration Gx_alt* of the alternator 15, and the difference between the target deceleration Gx* and the deceleration Gx(k) is compensated for on the basis of the target deceleration Gx_alt*, making it possible to relieve a shift shock at the time of shift control during the fuel cut.

When the fuel cut is performed, the deceleration of the vehicle cannot be adjusted by controlling the fuel injection amount, the ignition time lag, and the throttle opening. Accordingly, when the fuel cut is performed, the deceleration of the vehicle is adjusted by controlling the excitation current of the alternator 15, making it possible to appropriately adjust the deceleration of the vehicle.

When the fuel cut is not performed, the deceleration of the vehicle is adjusted by controlling at least one of the fuel injection amount, the ignition time lag, and the throttle opening, making it possible to more carefully adjust the deceleration of the vehicle.

The gear stage is selected such that the power balance of the battery becomes close to zero, making it possible to appropriately relieve a shift shock at the time of shift control during the fuel cut while minimizing the influence on the charge/discharge balance.

During the fuel cut, since the deceleration differs depending on a gear stage to be selected, charge/discharge control is performed in accordance with the deceleration of the gear stage to be selected and the shift timing at which shift control is performed, making it possible to appropriately relieve a shift shock at the time of shift control during the fuel cut.

Although the preferred embodiments of the invention have been described, the invention is not limited to the foregoing embodiments. For example, although in the foregoing embodiments, a case has been described where the excitation current of the alternator is controlled as an example of load control of an engine accessory, when the fuel cut is not performed, the deceleration of the vehicle may be compensated for (adjusted) on the basis of at least one of the fuel injection amount, the ignition time lag, and the throttle opening.

Although in the foregoing embodiments, a case has been described where the deceleration of the vehicle is controlled by load control of the alternator 15, as described above, the deceleration of the vehicle may be adjusted using any accessory, such as an air compressor, insofar as the accessory is mounted in the vehicle.

Although in the foregoing embodiments, a case has been described where, in Step S15, the ECU 17 subtracts the fuel cut return level difference-equivalent acceleration Gx_fc, which is generated at the time of the return from the fuel cut, from the target deceleration Gx_alt*, the target deceleration Gx_alt* may be set to 0 to stop the compensation by the alternator 15. In this way, it is possible to reduce the driving force level difference, which is generated at the time of the return from the fuel cut, with easy control.

Although in the foregoing embodiments, a case has been described where, in Step S31, the ECU 17 asymptotically approximates the target deceleration Gx_alt* to the fuel cut return level difference-equivalent acceleration Gx_fc from the fuel cut return engine speed Ne_fc+the asymptotic control amount approximation execution revolution speed α to the fuel cut return engine speed Ne_fc, in the interim, the target deceleration Gx_alt* may be set to 0 to stop the compensation by the alternator 15. In this way, it is possible to reduce the driving force level difference, which is generated at the time of the return from the fuel cut, with easy control.

Although in the foregoing embodiments, a case has been described where the ECU 17 smooths a change in the deceleration as an example of reducing a change in the deceleration during the fuel cut, a change in the deceleration may have a level difference (shock) insofar as a change in the deceleration can be reduced.

INDUSTRIAL APPLICABILITY

The invention can be used as a vehicle controller for a vehicle in which a fuel cut is performed to stop the fuel supply to the engine.

REFERENCE SIGNS LIST

1: vehicle controller, 11: control section, 12: battery voltage detection section, 14: control section, 15: alternator, 21: vehicle controller, 23: engine speed detection section, Gx*: target deceleration of engine, Gx(i): deceleration to be attained at each gear stage, Gx_alt*: target deceleration of alternator.

The invention claimed is:

1. A vehicle controller for a vehicle in which a fuel cut is performed to stop the fuel supply to an engine, comprising:
an electronic control unit configured to:
lessen a change in deceleration during the fuel cut by controlling a load of an engine accessory provided in the vehicle driven by power of the engine; and
select a gear stage of a transmission
such that a total amount of power charge/discharge of an electric storage device which is charged by an alternator becomes zero.

2. The vehicle controller according to claim 1, wherein a difference between the deceleration of the vehicle in which the fuel cut is performed and a target deceleration is compensated for by load control of the engine accessory.

3. The vehicle controller according to claim 1, wherein load control of the engine accessory changes on the basis of the presence/absence of the fuel cut being performed.

4. The vehicle controller according to claim 3 wherein the engine accessory is the alternator, and when the fuel cut is performed, the deceleration of the vehicle is adjusted by load control of the alternator.

5. The vehicle controller according to claim 3, wherein, when the fuel cut is not performed, the deceleration of the vehicle is adjusted on the basis of at least one of a fuel injection amount, an ignition time lag, and a throttle opening.

6. The vehicle controller according to claim 1, wherein, when the fuel cut is performed, a charge/discharge control is performed in accordance with the deceleration and shift timing.

7. The vehicle controller according to claim 1, wherein the gear stage is selected in accordance with an amount of charge or voltage of the electric storage device.

8. The vehicle controller according to claim 1, wherein, at a time of the start of the fuel cut, load control of the engine accessory gradually increases.

9. The vehicle controller according to claim 1, wherein the deceleration having a phase opposite to a fuel-cut-return-level difference-equivalent acceleration is generated immediately after a return from the fuel cut, due to the return from the fuel cut by load control that is conducted on the engine accessory.

10. The vehicle controller according to claim 1, wherein the gear stage is selected in accordance with an electrical energy generation integrated value of the alternator.

11. The vehicle controller according to claim 1, wherein, when returning from the fuel cut, the deceleration that is attained by load control of the engine accessory is asymptotically approximated to a fuel-cut-return-level difference-equivalent acceleration that is generated due to the return from the fuel cut.

* * * * *